US011570701B2

(12) United States Patent
Wei et al.

(10) Patent No.: US 11,570,701 B2
(45) Date of Patent: Jan. 31, 2023

(54) METHOD FOR SELECTING NSA AND SA NETWORKING MODE, AND TERMINAL DEVICE

(71) Applicant: Huawei Technologies Co., Ltd., Shenzhen (CN)

(72) Inventors: Zhenrong Wei, Beijing (CN); Li Shen, Beijing (CN); Hui Jin, Beijing (CN); Hao Song, Beijing (CN); Yanzhao He, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 120 days.

(21) Appl. No.: 17/256,536

(22) PCT Filed: Jul. 13, 2018

(86) PCT No.: PCT/CN2018/095534
§ 371 (c)(1),
(2) Date: Dec. 28, 2020

(87) PCT Pub. No.: WO2020/010595
PCT Pub. Date: Jan. 16, 2020

(65) Prior Publication Data
US 2021/0282077 A1    Sep. 9, 2021

(51) Int. Cl.
*H04W 48/16* (2009.01)
*H04W 48/18* (2009.01)
*H04W 84/04* (2009.01)

(52) U.S. Cl.
CPC ........... *H04W 48/16* (2013.01); *H04W 48/18* (2013.01); *H04W 84/042* (2013.01)

(58) Field of Classification Search
CPC ..................................................... H04W 48/16
See application file for complete search history.

(56) References Cited

U.S. PATENT DOCUMENTS

| 2013/0003697 A1* | 1/2013 | Adjakple | .......... H04W 36/0011 |
| | | | 370/331 |
| 2015/0208327 A1* | 7/2015 | Baratam | ............... H04W 48/16 |
| | | | 455/432.1 |

(Continued)

FOREIGN PATENT DOCUMENTS

| CN | 105592525 A | 5/2016 |
| CN | 108024299 A | 5/2018 |

(Continued)

OTHER PUBLICATIONS

Vivo, et al., "NR PBCH Content," 3GPP TSG-RAN WG2 NR Ad Hoc Qingdao, China, Jun. 27-29, 2017, R2-1706971, 5 pages.

(Continued)

*Primary Examiner* — Qutbuddin Ghulamali
(74) *Attorney, Agent, or Firm* — Conley Rose, P.C.

(57) ABSTRACT

A network search method includes presetting, by a terminal device, a Public Land Mobile Network (PLMN) and a networking mode associated with the PLMN, searching, by the terminal device based on a geographical location to obtain PLMN information of a current geographical location, determining, by the terminal device based on the preset PLMN and the networking mode associated with the PLMN, a current networking mode of the terminal device, and switching, by the terminal device, the networking mode based on a geographical location, signal strength, and a system message.

20 Claims, 9 Drawing Sheets

(56) References Cited

U.S. PATENT DOCUMENTS

| | | | |
|---|---|---|---|
| 2018/0302867 A1* | 10/2018 | Abedini | ............ H04W 56/0015 |
| 2019/0261236 A1 | 8/2019 | Wang et al. | |
| 2019/0261264 A1 | 8/2019 | Lou et al. | |
| 2021/0235365 A1 | 7/2021 | Jin et al. | |

FOREIGN PATENT DOCUMENTS

| | | |
|---|---|---|
| CN | 108024314 A | 5/2018 |
| CN | 108112055 A | 6/2018 |
| CN | 110430610 A | 11/2019 |
| EP | 2595427 A2 | 5/2013 |
| EP | 3280187 A1 | 2/2018 |
| WO | 2015108976 A1 | 7/2015 |
| WO | 2019233100 A1 | 12/2019 |

OTHER PUBLICATIONS

Verizon, et al., "Considerations on 5G icons," 3GPP TSG-RAN WG2 Meeting #102, Busan, South Korea, May 21-25, 2018, R2-1806813, 7 pages.

Nokia, et al., "SI contents for NSA and SA/NSA network sharing," 3GPP TSG-RAN WG2 Meeting NR Adhoc 1807, Montreal, Canada, Jul. 2-6, 2018, R2-1810295 (Revision of R2-1808521), 3 pages.

ZTE Corporation, et al., "Multi-PLMN aspects of NSA indication in SIB1," 3GPP TSG-RAN WG2 Meeting #101, Athens, Greece, Feb. 26-Mar. 2, 2018, R2-1802045, (revised version of R2-1710416), 4 pages.

* cited by examiner

METHOD FOR SELECTING NSA AND SA NETWORKING MODE, AND TERMINAL DEVICE

CROSS-REFERENCE TO RELATED APPLICATIONS

This application is a U.S. National Stage of International Patent Application No. PCT/CN2018/095534 filed on Jul. 13, 2018, which is hereby incorporated by reference in its entirety.

TECHNICAL FIELD

Embodiments of this application relate to the communications field, and in particular, to a network search method in which a terminal device selects an NSA or SA networking mode based on various complex networking modes.

BACKGROUND 5G is one of hot technologies in the information and communications field in next five years. The 5G is applicable to a plurality of application scenarios such as mobile internet and internet of things (for example, eMBB, mMTC, and URLLC), and presents features such as ultra-large capacity, ultra-high performance, multi-dimensional convergence, and low costs. In recent two years, the 5G is also developing in collaboration with artificial intelligence and information center networks, and the overall research and development and standardization processes are accelerated. Based on current key parameters, in different application scenarios, a 5G access peak rate experienced by a user reaches tens of Gb/s, which is 100 times or higher than that of 4G. End to end latency reaches ins or lower, which is 10 times higher than that of 4G, and synchronization precision needs to reach 100 ns. which is 10 times higher than that of 4G. In addition, new technologies such as network functions virtualization (NFV), software-defined networking (SDN), and network slicing are introduced in networking architecture and technologies.

According to the 3GPI) plan, 5G standards are classified into NSA and SA (Standalone, standalone). In a 5G NSA networking mode, a 4G base station and a 4G core network are required. The 4G is used as an anchor point of a control plane to meet the requirements of radical operators for quickly deploying 5G NR using existing LTE network resources. SA networking is independent of the 4G network, and a new network is constructed. Therefore, it is crucial to select a network search mode based on a networking mode of an operator.

SUMMARY

According to a first aspect, an embodiment of this application provides a method, including: obtaining, by a terminal device, preset information, where the preset information includes PLMN information and a networking mode associated with the PLMN information, and the networking mode includes a standalone SA mode and a non-standalone NSA mode; obtaining, by the terminal device, the PLMN information; and determining, by the terminal device based on the obtained PLMN information and the preset information, the networking mode associated with the obtained PLMN information. The preset information is stored in the terminal device or a server. That the terminal device obtains the PLMN information may be that the terminal device searches based on a geographical location to obtain the PLMN information through broadcast information.

This can implement a network search method in which the terminal device optimizes selection of NSA and SA modes in various complex networking modes.

In a possible design, when a first parameter is greater than a first threshold, the terminal device switches the networking mode associated with the obtained PLMN information to SA, and the networking mode associated with the obtained PLMN information is NSA. The first parameter is one or more parameters of a 5G access network: signal quality, signal strength, a transmission rate, a network registration success rate, and a packet loss rate. The networking mode can be switched based on a parameter.

In a possible design, geographical location information of the terminal device is obtained, and the geographical location information includes GPS information. The networking mode of the terminal is determined based on communication fingerprint library information and the geographical location information.

In a possible design, after the networking mode is determined, the terminal may further register with an associated 4G or 5G network, to quickly register with the network.

According to a second aspect, another embodiment of this application provides a method, including: obtaining a system message, where the system message includes a field IE upper layer indication-R15, and the field is used to indicate that a current cell has 5G cell coverage; and switching, by a terminal device, a networking mode associated with obtained PLMN information to SA. The networking mode can be switched based on the system information, According to a third aspect, another embodiment of this application provides a method, including: obtaining one or more of the following parameters: an ID, signal quality, and signal strength that are of a current cell, an ID, signal quality, and signal strength that are of a neighboring cell, and Wi-Fi AP information; and determining a networking mode of the current cell based on the one or more parameters and a communication fingerprint library, where the communication fingerprint library stores IDs, signal quality, and signal strength of cells in all standards of the current cell, IDs, signal quality, and signal strength of neighboring cells, and the Wi-Fi AP information.

It should be noted that, in the embodiments of this application, different technical effects can be achieved through arbitrary combination.

According to the foregoing solutions, in the embodiments of this application, for different network deployment, the terminal device can dynamically switch the network search method of the terminal device based on operator-related information in a prestored database, some real-time status information of the terminal device, and obtained network information.

DESCRIPTION OF EMBODIMENTS

In a process of constructing a 5G (fifth generation communications technology) network, whether to use LTE (Long Term Evolution, long term evolution technology) and 5G non-standalone (Non-standalone, NSA for short, also referred to as "non-standalone networking") or 5G standalone networking (Standalone, SA for short) is a problem that operators need to consider. On the one hand, the non-standalone helps reduce construction costs through existing LTE resources, and on the other hand, the 5G standalone helps demonstrate 5G technical advantages to improve service quality. Whether 5G SA networking or 5G NSA networking is used depends on operators. For example, among operators in China, China Mobile claims to use 5G for continuous coverage. Therefore, the 5G standalone is recommended. However, China Unicom considers fast deployment. In white paper of China Unicom, China Unicorn specifies that a 5G and LTE non-standalone mode is used for network construction at an initial stage.

3GPP specifications define a plurality of networking modes for different wireless networks and core networks, so that operators can make choices based on their needs. The selection varies with a construction phase. For example, whether to deploy a new next generation core (NGC, Next Generation Core) or upgrade an EPC (Evolved Packet Core), whether to provide hotspot coverage or continuous coverage, and whether to consider interoperability between LTE and a 5G radio system. Operators may select a plurality of networking modes or manners, such as the standalone, the non-standalone, or even hybrid networking. For a terminal device, working modes of NSA and SA are determined. A proper and matched networking mode can bring better user experience, to achieve lower power consumption.

When a networking mode in which the terminal device works does not match a. networking mode of an operator, network search efficiency is low and power consumption is high. For example, if the terminal device works in the SA networking mode, to register with an NR (New Radio, 5G access network) network, the terminal device searches for the NR network for a long time. However, in this case, if the network does not support the SA networking mode or does not support independent registration with the NR network, power consumption of the terminal device is high, or even there is no network service. For another example, if the terminal device works in the NSA mode, because the terminal device does not perform an independent NR search, the terminal device cannot register with an NR network of a highest standard. However, the current network supports the SA networking mode. The terminal device incorrectly considers that the current network cannot independently register with the SA networking. As a result, a user cannot enjoy better 5G services.

Figure 1:
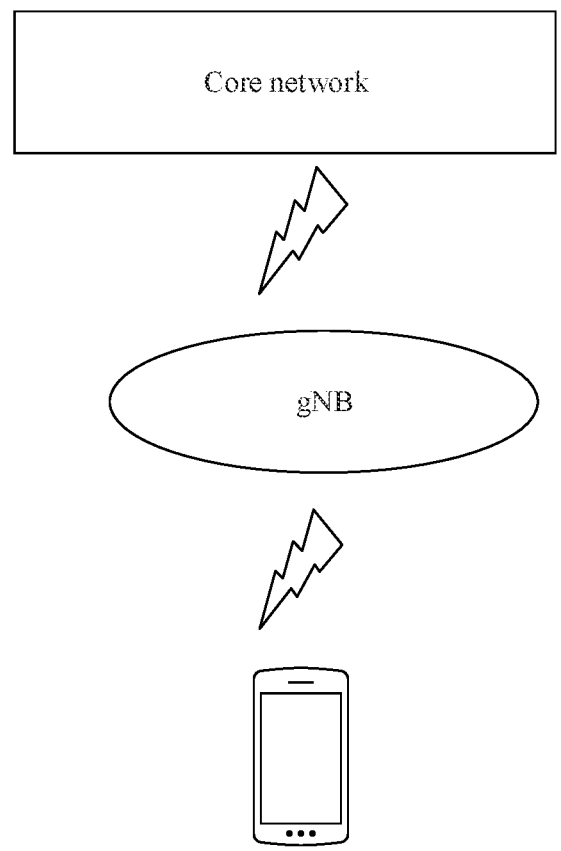
FIG. 1 is a schematic diagram of an SA networking mode according to a possible implementation of this application.

FIG. 1 is a schematic diagram of an SA networking mode according to a possible implementation of this application.

An existing standard defines a plurality of networking modes, including a plurality of possible networking modes such as option 1, option 2, option 3/3a, option 4/4a, option 5, option 6, option 7/7a, and option 8/8a. Among these networking modes, an SA networking mode and an NSA networking mode are included. As shown in FIG. 1, a schematic diagram of a possible SA networking mode is provided. A terminal device is connected to a core network through a 5G base station gNB.

In 5G standalone, an end-to-end 5G network architecture is used. 5G standards are used for the terminal device, gNB, and a next generation core (NextGen Core) NGC, to support 5G interfaces, implement 5G functions, and provide 5G services.

In a possible embodiment, a typical SA networking mode is similar to option 2.

Figure 2:
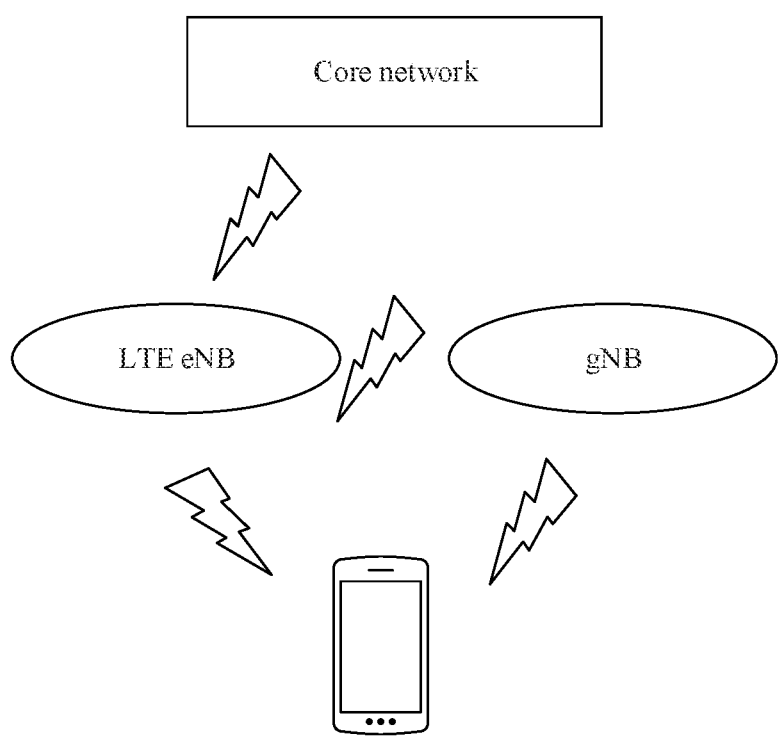
FIG. 2 is a first schematic diagram of an NSA networking mode according to a possible implementation of this application.

FIG. 2 is a schematic diagram of an NSA networking mode according to a possible implementation of this application 5G non-standalone (NSA) refers to joint networking of LTE and 5G based on a dual connectivity technology, which is also referred to as tight-interworking between LTE and 5G. When dual connectivity is used, other data is split at a core network or a PDCP (Packet Data Convergence Protocol, packet data convergence protocol layer), user data flows are simultaneously transmitted to a user through a plurality of base stations. When the LTE and a 5G system are in the joint networking, there are a plurality of choices for the core network and a wireless network.

As shown in FIG. 2, when a core network uses a 4G evolved packet core EPC (Evolved Packet Core), data may be transmitted to a terminal user through an LTE eNB, or may be transmitted to 5G NR (New Radio, 5G access network) through an air interface, and is transmitted to a terminal device through NR.

It should be noted that the SA networking mode and the NSA networking mode listed in this embodiment may not constitute a limitation on this application. For example, according to a protocol, option 3/3a/3x is a typical NSA networking mode, and option 2 is a typical SA networking mode. The foregoing provides only examples of several common typical connection modes of the SA and the NSA. This is not limited in this application.

Table 1 is a preset table of an operator and a networking mode provided according to a. possible implementation of this application.

As shown in Table 1, the preset table includes a public land mobile network (Public Land Mobile Network, PLMN) and a networking mode (NSA, SA) associated with the PLMN. The PLMN is used to distinguish mobile communications operators in a country or region, and one country or region may include one or more public land mobile communications networks. In a possible implementation, one PLMN may be associated with SA, for example, a PLMN 1 or a PLMN 2. In a possible implementation, one PLMN may be associated with NSA, for example, a. PLMN 3 and a PLMN 4. In a possible implementation, one PLMN may be associated with hybrid networking. In other words, two networking modes of NSA/SA are supported, for example, a. PLMN 5.

TABLE 1

Preset table of an operator and a network mode

| INDEX | PLMN | Networking mode |
|---|---|---|
| 1 | PLMN 1 | SA |
| 2 | PLMN 2 | SA |
| 3 | PLMN 3 | NSA |
| 4 | PLMN 4 | NSA |
| 5 | PLMN 5 | SA and NSA |
| 6 | PLMN 6 | . . . |

It should be noted that preset information is used to represent the PLMN and the networking mode associated with the PLMN, and the preset table is a representation manner of the preset information. In some embodiments, the preset information may also be in a format such as a packet, data, or a message, The preset table may be stored in the terminal device, for example, stored by a manufacturer of the terminal device during production. In a possible implementation, the preset table may be stored in a terminal cloud, or may be stored in a database (data base). In some embodiments, the preset table may also be updated, including operations such as deleting, modifying, and adding information, For example, when the terminal device is in international roaming, the PLMN and the networking mode associated with the PLMN may be added. For another example, in different geographical locations, a same operator may support different networking modes.

In some implementations, the preset table may further store network status information of different networking modes of an operator. For example, China Mobile supports an SA/NSA hybrid networking mode, and records network status information of the two networking modes. The network status information may be a parameter that represents a network status, such as a packet loss rate, a network registration success rate, a network speed, signal strength, or signal quality. In some embodiments, a preferred networking mode recommended based on a geographical location may be recorded. For example, in the hybrid networking mode, network status information of SA or NSA is compared, and the preferred networking mode is recommended or automatically connected. In some embodiments, information in the preset table may further include location information.

In some embodiments, the preset table information may record, based on the geographical location, network status information such as signal quality and signal strength of different standards of different operators in a geographical location, a quantity of times and a probability that the terminal device successfully registers with a networking mode, a registration time, and a status of the terminal device. The terminal device may record the network status information of the location for a plurality of times, and update the information. The terminal device may further recommend an optimal networking mode based on the foregoing network status information. For example, the terminal device moves from a location A to a location B, and determines, based on the preset information, that an NSA networking mode at the location B is an optimal network, and hands over to the NSA network. The recommended optimal networking mode may be based on signal quality, signal strength, a quantity of times and a probability that the terminal device successfully registers with a networking mode, and the like.

It should be noted that the geographical location in this application may be a cell covered by an access point signal, or may be a location covered by a GPS (Global Positioning System) signal, or may be virtual space obtained by clustering based on recorded network status information. This is not limited in this application.

Figure 3:
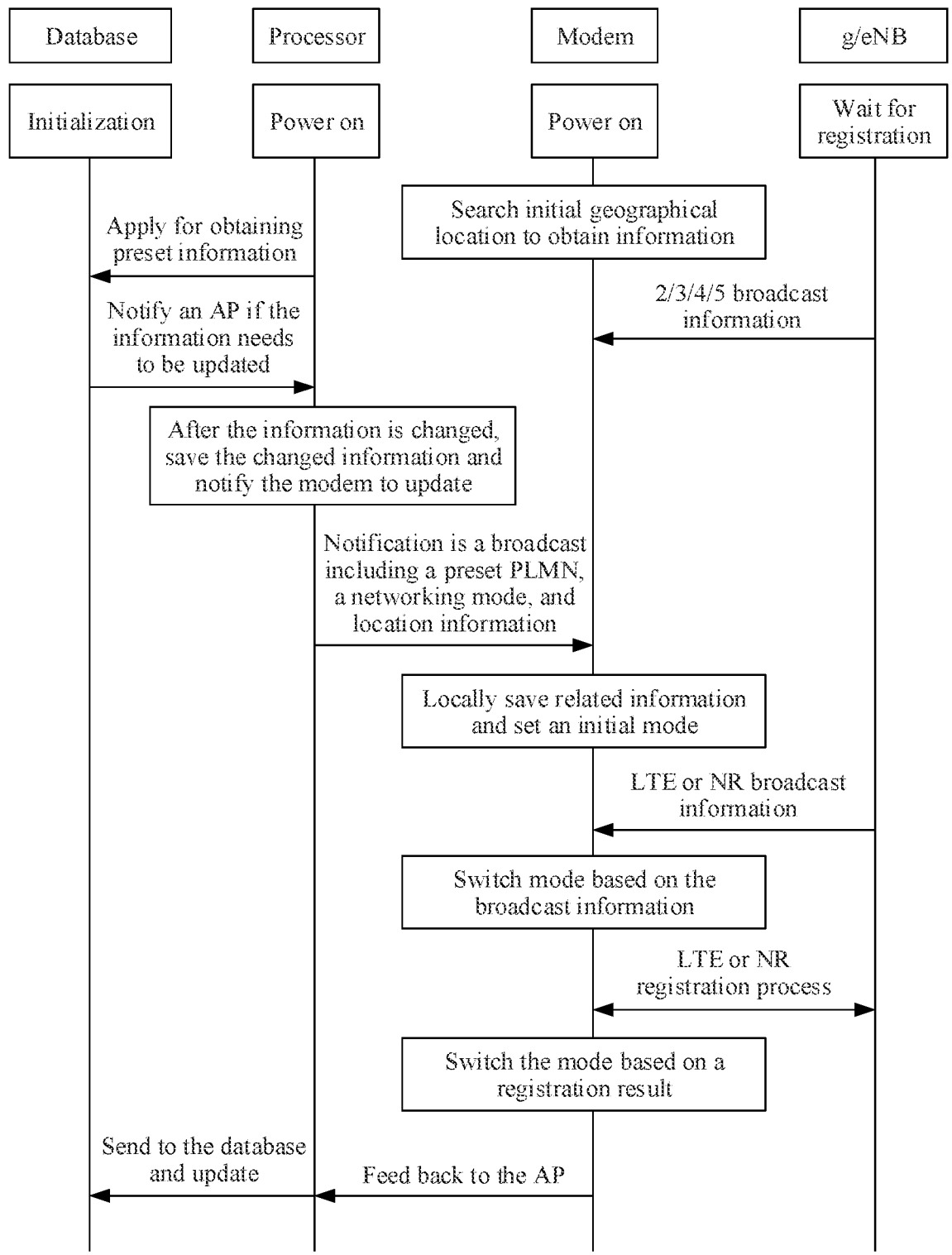
FIG. 3 is a flowchart of an initialization phase according to a possible implementation of this application.

FIG. 3 is a flowchart of an initialization phase according to a possible implementation of this application.

As shown in FIG. 3, in sonic embodiments, after a terminal device is powered on for the first time, powered on, or reselects a cell, an initial working mode may be set based on an operator of a SIM card, for example, in an HPLMN (Home PLMN) manner. In some embodiments, when the terminal device does not obtain a geographical location, the terminal device may select in a manner preset by the operator.

A detailed processing procedure is as follows.

On an application processor AP (Application Processor) side, after power-on and initialization, the AP obtains preset information from a database, for example, preset table information of the operator and the networking mode shown in Table 1. In some embodiments, if it is detected that the preset information in the preset table is updated, for example, a new PLMN or networking mode is added, the AP obtains updated preset table information.

After obtaining the preset table information, the AP locally stores the preset table information, and sends a notification to a modem (modem), For example, the notification may be a broadcast including information such as a preset PLMN, a networking mode, and a location.

On a modem side, after being powered on and initialized, the modem may search for a geographical location, for example, may obtain op information such as PLMN information through 2G/3G/4G/5G broadcast information. In some embodiments, the modem may search for current network information based on location information.

After receiving the preset table information sent by the AP, the modem locally stores the preset table information, and sets an initial mode based on a result of searching the geographical location, for example, operator information. For example, after obtaining, based on the geographical location, that the PLMN of the operator is China. Mobile, the modem determines that the networking mode of China. Mobile is NSA based on the preset table information sent by the AP side. In this case, the initial mode is to register with an NSA network of China Mobile.

4G or 5G broadcast information is obtained based on the initial mode, and registration of the 4G or 5G network is completed.

In some embodiments, a network that is successfully registered may be switched to different networks for registration due to factors such as a geographical location, signal strength, and a system message, and the network is fed back to a database through an AP based on a 4G registration result and a 5G registration result. If new data exists, the database is updated and stored.

Figure 4:
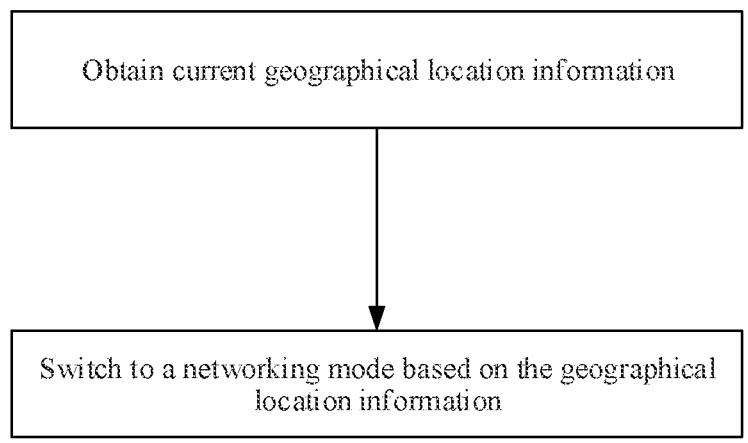
FIG. 4 is a first flowchart of switching a networking mode based on a geographical location according to a possible implementation of this application.

FIG. 4 is a. flowchart of switching a networking mode based on a geographical location according to a. possible implementation of this application, As shown in FIG. 4, a terminal device may switch between an SA networking mode and an NSA networking mode based on geographical location information, which is applicable to a scenario in which an operator supports a hybrid networking mode in some embodiments. For example, in an urban area, the operator may use the SA networking mode. However, in a suburban area, considering factors such as a quantity of users, the operator may use the NSA networking mode. When moving, the terminal device may automatically switch a networking mode based on current location information.

In some embodiments, even in a same geographical location, a hybrid networking mode may be supported, and an appropriate networking mode may be selected based on network status information. For example, when the terminal device moves to a location C, it is detected that the terminal device may independently register with the SA networking mode and the NSA networking mode at the location C, and based on the network status information, for example, signal strength, a networking mode may be selected to camp on and attempt to register with the networking mode.

Figure 5:
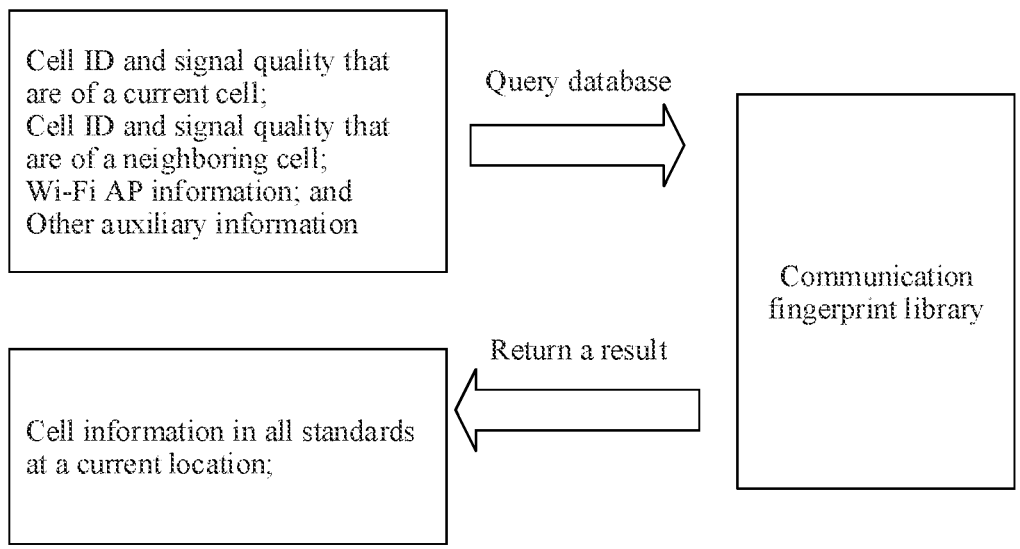
FIG. 5 is a second flowchart of switching a networking mode based on a geographical location according to a possible implementation of this application.

As shown in FIG. 5, a terminal device may obtain communication fingerprint library information. Specifically, in some implementations, the communication fingerprint library information includes a cell ID, signal quality, signal strength that are of a current cell, a cell ID, signal quality, signal strength that are of a neighboring cell, Wi-Fi AP (Access Point, access point) information, and other auxiliary information (such as Bluetooth information and other network parameters). In some embodiments, the cell ID, the signal quality, the signal strength that are of the current cell, the cell ID, the signal quality, the signal strength that are of the neighboring cell, the Wi-Fi AP (Access Point, access point) information, and other auxiliary information (such as the Bluetooth information and other network parameters) in the communication fingerprint library information may be in a plurality of standards (for example, in a 2G/3G/4G/5G standard).

In some implementations, the communication fingerprint library information may be updated, including operations such as deleting, modifying, and adding information.

In some embodiments, the communication fingerprint library information may be stored in the terminal device, or may be stored in a server, or may be stored in a database.

In some embodiments, a communication fingerprint library may record, in a plurality of standards at a historical location (for example, a location D), a. cell ID, signal quality, and signal strength that are of a current cell, a cell ID, signal quality, and signal strength that are of a neighboring cell, Wi-Fi AP (Access Point, access point) information, and other auxiliary information. (fix example, Bluetooth information), and a networking mode at the location D is recommended based on a specific condition or threshold. For example, when a mobile device moves to the location D again, the terminal device can automatically switch to or recommend the networking mode, or may prompt, in a form of an interface, a user to manually connect to the networking mode. That the mobile device moves to the location D again is determined may be: The terminal device obtains one or more pieces of information in the communication fingerprint library, matches fingerprint library information, and determines that a current location is the location D.

In some embodiments, the terminal device obtains, based on a current geographical location, a cell ID, signal quality, signal strength that are of a current cell, a cell ID, signal quality, signal strength that are of a neighboring cell, Wi-Fi. AP (Access Point, access point) information, and other auxiliary information (for example, Bluetooth information). Based on the foregoing information, the terminal device queries a communication fingerprint database for cell information in all standards at the current location, and switches to a matching networking mode. For example, the terminal device obtains an ID number of the current cell based on the current geographical location, and may query, based on the ID number, cell information, of the current cell, in all standards in the communication fingerprint database. In this way, the terminal device may switch the networking mode based on the cell information.

Figure 6:
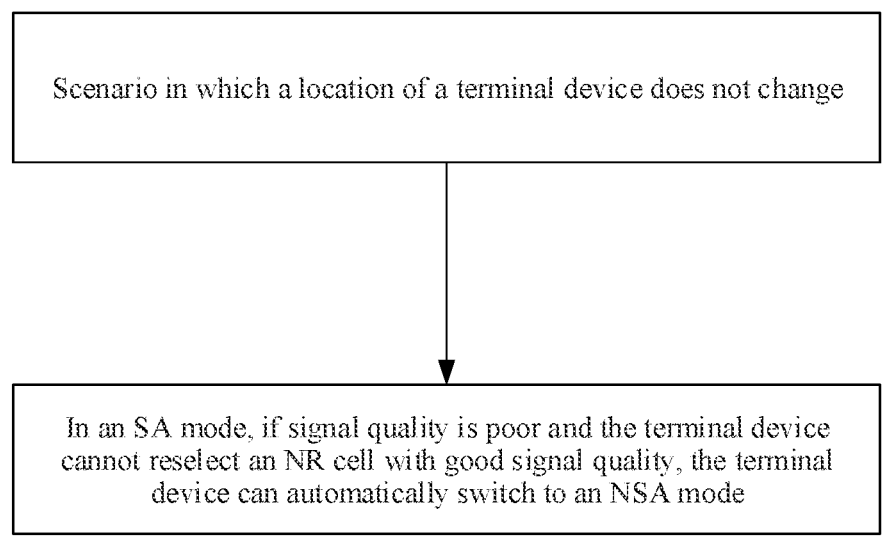
FIG. 6 is a flowchart of switching a networking mode based on signal strength according to a possible implementation of this application.

FIG. 6 is a flowchart of switching a networking mode based on signal strength according to a possible implementation of this application.

If a terminal device currently works in an SA networking mode, in a scenario in which a location of the terminal device does not change, for example, the terminal device is stationary or moves a little, or a moving location is insufficient for a GPS to detect, or is within a coverage range of a same access point signal, the terminal device can autonomously switch to an NSA networking mode based on signal strength of NR (New Radio, 5G access network).

In a possible implementation, when a current NR signal is also relatively weak or cannot be connected to an NR network, the terminal device may switch to the NSA networking mode.

In a possible implementation, a signal strength threshold may be set, and when the signal strength is less than the threshold, the networking mode is switched from the SA mode to the NSA mode The signal strength may also be a change or an average value of signal amplitudes within a predetermined time period.

In some embodiments, the terminal device is located at a location, for example, a location E. An SA networking mode and an NSA networking mode of an operator are supported at the location E, and the terminal device may switch the networking mode based on the signal strength.

Figure 7:
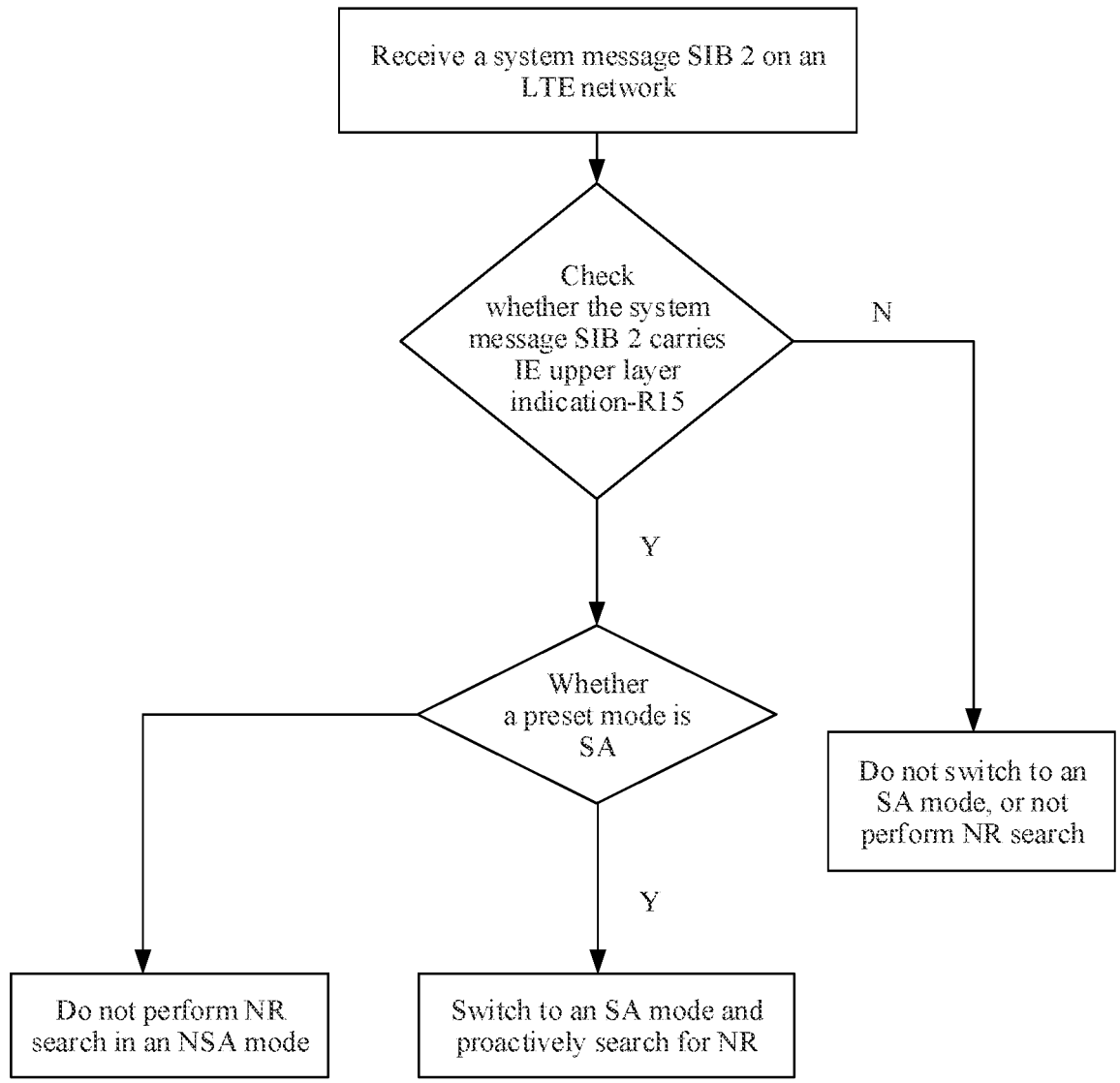
FIG. 7 is a flowchart of switching a networking mode based on a system message according to a possible implementation of this application.

FIG. 7 is a flowchart of switching a networking mode based on a system message according to a possible implementation of this application.

A terminal device needs to obtain system information (System Information) of a cell, to access the cell and correctly work in the cell, The system information is cell-level information. In other words, the system information takes effect for all terminal devices that access the cell. The system information is organized in a system information block (System Information Block, SIB) manner. Each SIB includes a series of parameter sets related to a function. SIB types include a SIB 1 to a SIB 13.

Specifically, the SIB 2 includes common radio resource configuration information, for example, resource allocation and scheduling of an uplink RACK a PUCCH, a PUSCH, and an SRS, uplink channel power control information; channel resource configuration of a downlink BCCH, a PDSCH, and a PCCH; and includes an information element (IE), which is specifically upper layer indication-R15. For specific IE description, reference may be made to "PLMN-Info-R15::=SEQUENCE {upper layer indication-R15 ENUMERATED {true} OPTIONAL—Need OR}" recorded in the protocol document 36331-f10.

"NR indicator should indicate that the E-UTRA cell has the possibility to add NR as secondary RAT for EN-DC" is recorded in the protocol. In other words, the NR indicator may be used to indicate that an NR cell exists in a current LTE dual connectivity. For details, refer to the proposal R2-1713443.

In a possible implementation, the IE upper layer indication-R15 may be used to indicate that NR cell coverage exists within coverage of the LTE cell, and EN-DC (E-UTRA-NR Dual Connectivity) may be performed. When the system message received by the terminal device includes the information, the terminal device reminds or automatically switches to an SA networking mode. For example, if a preset mode associated with a PLMN is the SA networking mode, the terminal device can switch to the SA networking mode and proactively search for NR when the LTE system message carries the IE upper layer indication-R15. If the preset mode associated with the PLMN is an NSA networking mode, NR search is not performed.

If the LTE system message does not carry the IE upper layer indication-R15, the terminal device does not switch to the SA networking mode or perform NR search.

In some embodiments, this embodiment is applicable to a scenario in which the NSA networking mode is currently used, or the terminal device is currently registered with an LTE network.

Figure 8:
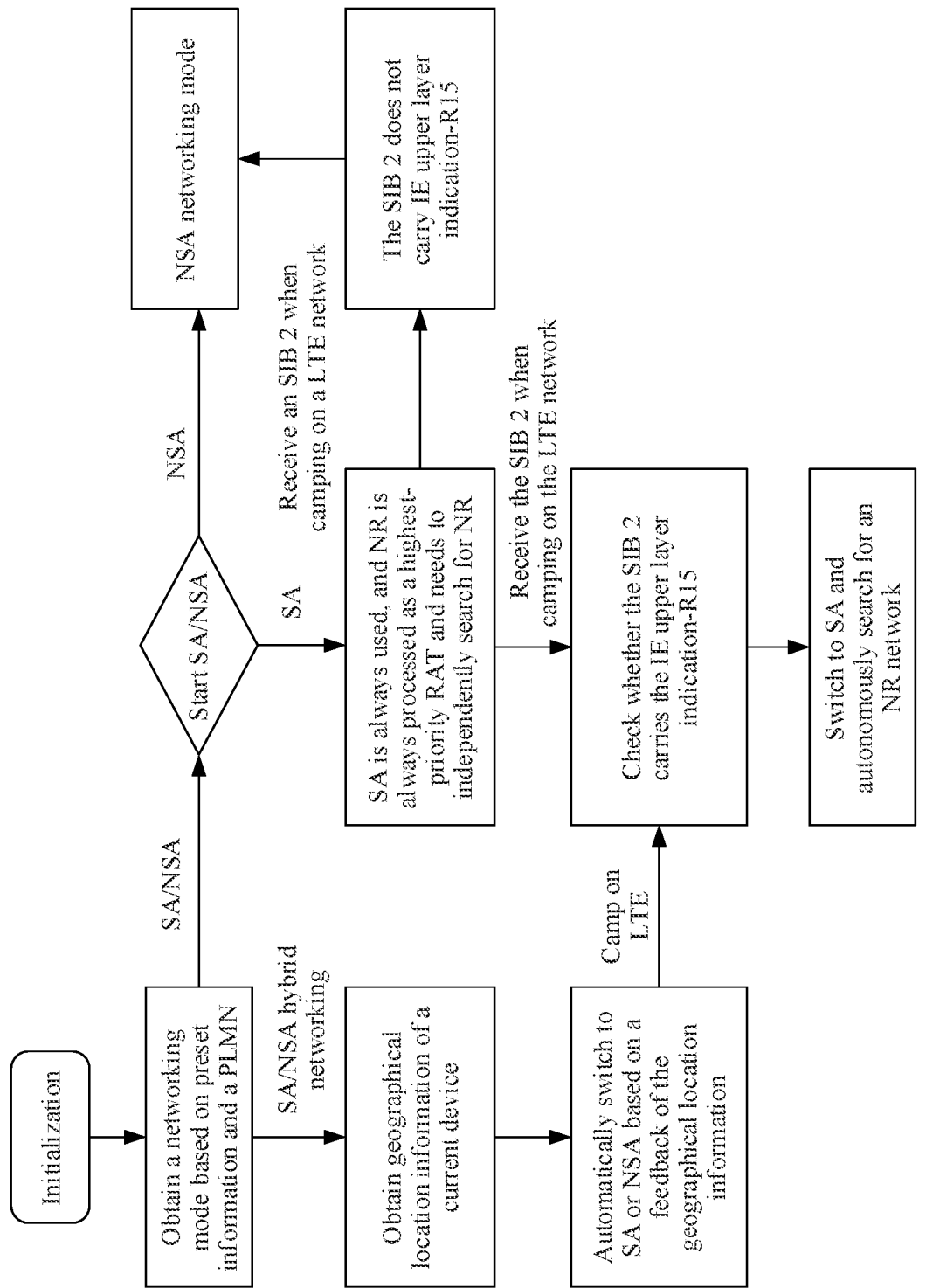
FIG. 8 is a flowchart of dynamically switching an SA phase and an NSA phase according to a possible implementation of this application.

FIG. 8 is a flowchart of dynamically switching an SA phase and an NSA phase according to a possible implementation of this application.

As shown in FIG. 8, an initial mode may be set according to the initialization procedure shown in FIG. 4. For example, after it is obtained based on a geographical location that a PLMN of an operator is China Mobile, it is determined, based on preset table information sent by an AP side, that a networking mode of China Mobile is NSA. In this case, the initial mode is to register with an NSA network of China Mobile.

After the initial mode is set, it is determined that a hybrid networking mode is supported, geographical location information of a current device is obtained, and a networking mode is automatically switched based on geographical location information feedback, for example, through information query in a communication fingerprint library. If it is determined that the SA networking mode is currently used, the networking mode may be switched to the NSA networking mode. In a possible design, if a current networking mode is the NSA networking mode, and a received SIB 2 includes IE upper layer indication-R15, the networking mode may be switched to the SA networking mode.

If the initial networking mode is the SA networking mode, the SA networking mode is always used, and NR can be processed as a highest-priority RAT (radio access technology). In this case, an independent NR network search is required. In a possible design, if the initial mode is the SA networking mode, but a current network camps on an LTE network, and the received SIB 2 includes the IE upper layer indication-R15, the SA networking mode is retained, and the NR network is searched. In a possible design, if the initial mode is the SA networking mode, but the current network camps on the LTE network, and the received SIB 2 does not include the IF upper layer indication-R15, the networking mode is switched to the NSA networking mode.

In some embodiments, the initial mode may alternatively be the NSA networking mode.

Figure 9:
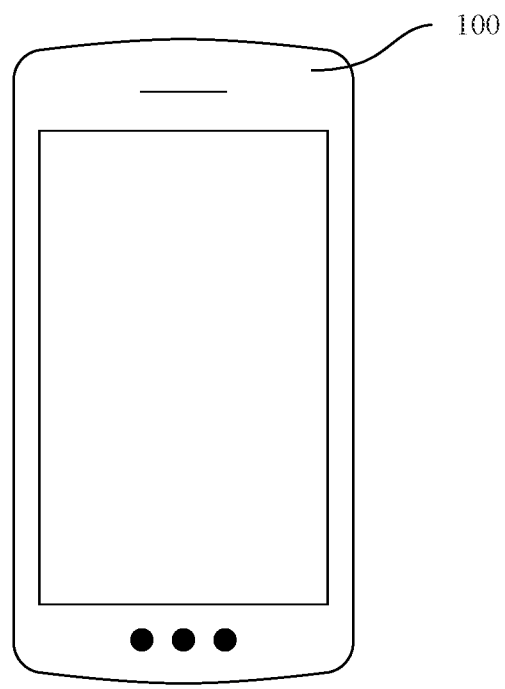
FIG. 9 is a schematic diagram of a terminal device according to a possible implementation of this application.

FIG. 9 is a schematic diagram of a terminal device according to a possible implementation of this application.

A terminal device 100 in the embodiments of this application may include a terminal device, a tablet computer, a PDA (Personal Digital Assistant, personal digital assistant), a POS (Point of Sales, point of sales terminal), a vehicle-mounted computer, a TV, a wearable device, an AR, a VR device, and the like.

Figure 10:
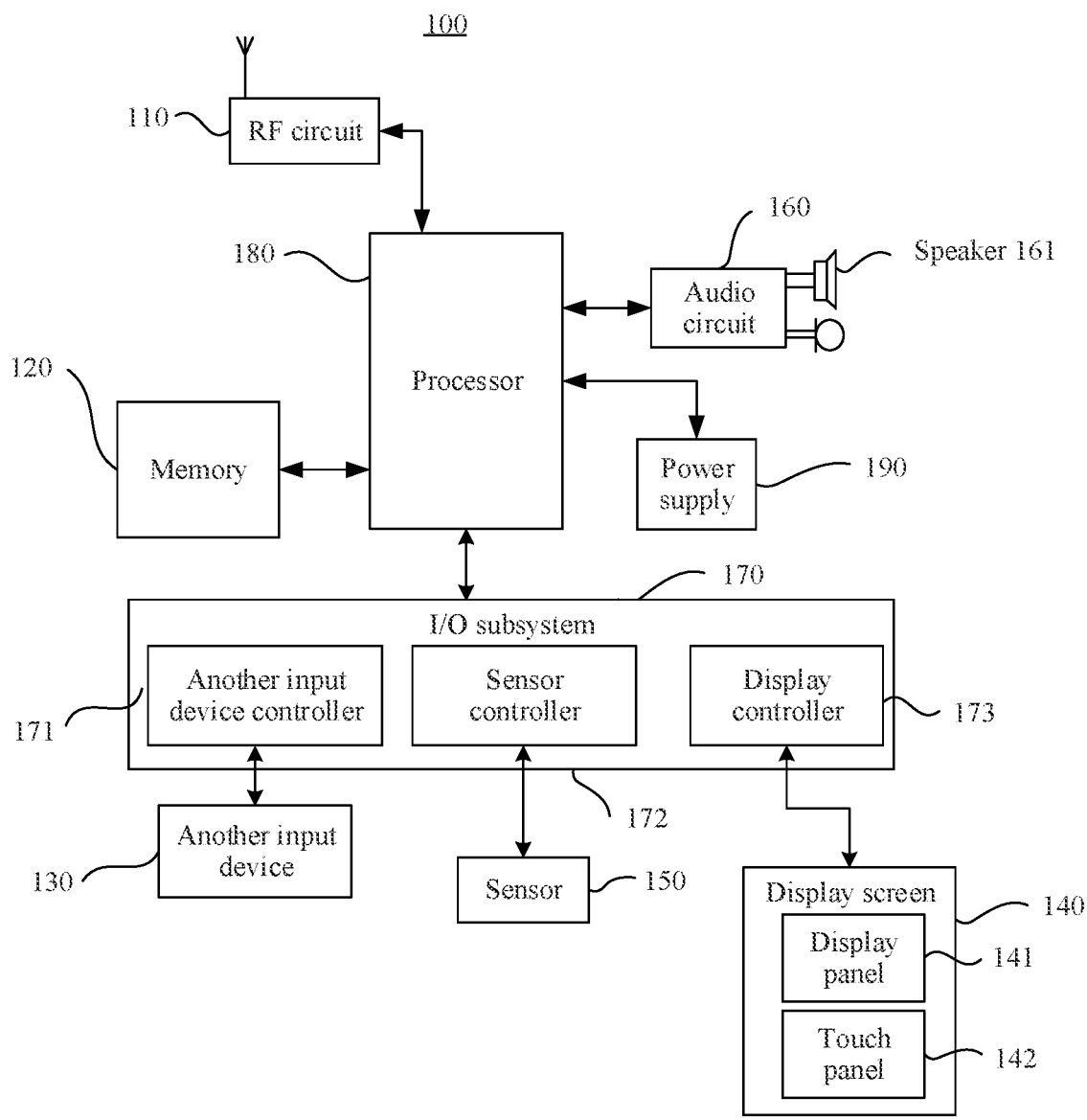
FIG. 10 is a block diagram of a partial structure of a terminal device according to a possible implementation of this application.

For example, the terminal device 100 is a terminal device. FIG. 2 is a block diagram of a partial structure of the terminal device 100 related to this embodiment of this application. Referring to FIG. 10, the terminal device 100 includes components such as an RF (Radio Frequency, radio frequency) circuit 110, a memory 120, another input device 130, a display screen 140, a sensor 150, an audio circuit 160, an I/O subsystem 170, a processor 180, and a power supply 190. A person skilled in the art may understand that the structure of the terminal device shown in FIG. 10 does not constitute a limitation on the terminal device, and the terminal device may include more or fewer components than those shown in the figure, or some components may be combined, or some components may be split, or a component may be deployed differently. A person skilled in the art may understand that the display screen 140 is a user interface (UI, Terminal Interface). and the terminal device 100 may include more or fewer user interfaces than those shown in the figure.

The following specifically describes each constituent component of the terminal device 100 with reference to FIG. 10.

The RF circuit 110 may be configured to receive and send information, or receive and send signals during a call, and particularly, receive downlink information from a base station, and then send the downlink information to the processor 180 for processing. In addition, the RF circuit 110 sends related uplink data to the base station. The RF circuit usually includes but is not limited to an antenna, at least one amplifier, a transceiver, a coupler, an LNA (Low Noise Amplifier, low noise amplifier), a duplexer, and the like. In addition, the RF circuit 110 may further communicate with a network and another device through wireless communication. Any communications standard or protocol may be used for the wireless communication, including but not limited to GSM (Global System of Mobile communication, global system of mobile communication), CPRS (General Packet Radio Service, general packet radio service), CDMA (Code Division Multiple Access, code division multiple access), WCDMA (Wideband Code Division Multiple Access, wideband code division multiple access), LTE (Long Term Evolution, long term evolution), email, SMS (Short Messaging Service, short messaging service), and the like.

The storage 120 may be configured to store a software program and a module, and the processor 180 executes various functional applications of the terminal device 100 and data processing by running the software program and the module that are stored in the storage 120. The memory 120 may mainly include a program storage area and a data storage area. The program storage area may store an operating system, an application program required by at least one function (such as a sound play function or an image play function), and the like. The data storage area may store data (such as audio data or a phone book) created according to use of the terminal device 100, and the like. In addition, the memory 120 may include a high-speed random access memory, and may further include a non-volatile memory, for example, at least one magnetic disk storage device, a flash memory, or another volatile solid-state storage device.

The another input device 130 may be configured to: receive input digital or character information, and generate key signal input related to a user setting and function control of the terminal device 100. Specifically, the another input device 130 may include but is not limited to one or more of the following: a physical keypad, a function key (for example, a volume control key or an on/off key), a trackball, a mouse, a joystick, an optical mouse (the optical mouse is a touch-sensitive surface that does not display a visual output, or is an extension of a touch-sensitive surface formed by a touchscreen), and the like. The another input device 130 is connected to another input device controller 171 of the I/O subsystem 170, and perform signal exchange with the processor 180 under control of the another input device controller 171.

The display 140 may be configured to display information entered by a user or information provided for a user, and various menus of the terminal device 100, and may further receive user input. Specifically, the display screen 140 may include a display panel 141 and a touch panel 142. The display panel 141 may be configured in a form of an LCD (Liquid Crystal Display, liquid crystal display), an OLED (Organic Light-Emitting Diode, organic light-emitting diode), or the like. The touch panel 142 is also referred to as a touchscreen, a touch-sensitive screen, or the like, and may collect a touch operation or non-touch operation of a user on or near the touch panel (such as an operation of the user on the touch panel 142 or near the touch panel 142 by using any suitable object or accessory such as a finger or a stylus, or including a motion sensing operation including operation types such as an isolated control operation and a multipoint control operation), and drive a corresponding connection apparatus based on a preset program. Optionally, the touch panel 142 may include two parts: a touch detection apparatus and a touch controller. The touch detection apparatus detects a touch position and a gesture of the user, detects a signal generated by the touch operation, and transfers the signal to the touch controller. The touch controller receives touch information from the touch detection apparatus, converts the touch information into information that can be processed by the processor and then sends the information to the processor 180, and can receive a command sent by the processor 180 and execute the command. In addition, the touch panel 142 may be implemented in a plurality of types such as a resistive type, a capacitive type, an infrared type, and a surface acoustic wave type; or the touch panel 142 may he implemented through any technology to be developed in the future. Further, the touch panel 142 may cover the display panel 141. The user may perform, based on content (the displayed content includes, but is not limited to, a soft keyboard, a virtual mouse, a virtual key, an icon, and the like) displayed on the display panel 141, an operation on or near the touch panel 142 covering the display panel 141. After detecting the touch operation on or near the touch panel 142, the touch panel 142 transfers the touch operation to the processor 180 through the I/O subsystem 170, to determine a. touch operation type to determine the user input. Subsequently, the processor 180 provides a. corresponding visual output on the display panel 141 through the I/O subsystem 170 based on the touch operation type. In FIG. 2, the touch pan& 142 and the display panel 141 are used as two independent parts to implement input and output functions of the terminal device 100. However, in some embodiments, the touch panel 142 and the display panel 141 can he integrated to implement the input and output functions of the terminal device 100.

The terminal device 100 may further include at least one sensor 150 such as an optical sensor, a motion sensor, and other sensors. Specifically, the light sensor may include an ambient light sensor and a proximity sensor. The ambient light sensor may adjust luminance of the display panel 141 based on brightness of ambient light. The proximity sensor may turn off the display panel 141 and/or backlight when the terminal device 100 moves to an ear. As one type of the motion sensor, an accelerometer sensor may detect values of acceleration in various directions (usually on three axes). The accelerometer sensor may detect a value and a direction of gravity when the accelerometer sensor is in a static state, and may be applied to an application for recognizing a terminal device posture (such as switching between a landscape screen and a vertical screen, a related game, and magnetometer posture calibration), a function related to vibration recognition (such as a pedometer and a knock), and the like. Other sensors such as a gyroscope, a barometer, a hygrometer, a thermometer, and an infrared sensor may be further configured in the terminal device 100. Details are not described herein again.

The audio frequency circuit 160, the speaker 161, and the microphone 162 may provide an audio interface between the user and the terminal device 100. The audio circuit 160 may convert received audio data into a signal and transmit the signal to the speaker 161, and the speaker 161 converts the signal into a sound signal for output. In addition, the microphone 162 converts a collected sound signal into a signal, and the audio circuit 160 receives the signal, converts the signal into audio data, and then outputs the audio data to the RF circuit 108, to send the audio data to, for example, another terminal device, or outputs the audio data to the memory 120 for further processing.

The I/O subsystem 170 is configured to control an external input/output device, and may include another input device controller 171, a sensor controller 172, and a display controller 173. Optionally, one or more another input control device controllers 171 receive a signal from the another input device 130 and/or send a signal to the another input device 130. The another input device 130 may include a physical button (a pressing button, a rocker button, and the like), a dial pad, a slider switch, a joystick, a click scroll wheel, or an optical mouse (the optical mouse is a touch-sensitive surface that does not display a visible output, or an extension of a touch-sensitive surface formed by a touchscreen). It is worth noting that the another input device controller 171 may be connected to any one or more of the foregoing devices. The display controller 173 in the I/O subsystem 170 receives a signal from the display screen 140, and/or sends a signal to the display screen 140. After the display screen 140 detects the user input, the display controller 173 converts the detected user input into interaction with a user interface object displayed on the display screen 140. To be specific, man-machine interaction is implemented. The sensor controller 172 may receive a signal from one or more sensors 150, and/or send a signal to one or more sensors 150.

The processor 180 is a control center of the terminal device 100, and connects to various parts of the terminal device through various interfaces and lines. The processor 180 performs various functions of the terminal device 100 and data processing by running or executing a software program and/or a module stored in the memory 120 and by invoking data stored in the memory 120, to perform overall monitoring on the terminal device. Optionally, the processor 180 may include one or more processing units. Preferably, an application processor and a modern processor may be integrated into the processor 180. The application processor mainly handles an operating system, a user interface, an application program, and the like. The modem processor mainly handles radio communication. It may be understood that the modem processor may not be integrated into the processor 180.

The terminal device 100 further includes the power supply 190 (such as a battery) that supplies power to each component. Preferably, the power supply may be logically connected to the processor 180 through a power supply management system, to implement functions such as charging management, discharging management, and power consumption management through the power supply management system.

The technical solutions of the embodiments of this application may be applied to various communications systems, such as: a global system for mobile communication (Global System of Mobile Communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD), a universal mobile telecommunications system (Universal Mobile Telecommunications System, UMTS), a worldwide interoperability for microwave access (Worldwide Interoperability for Microwave Access, WiMAX) communications system, a future $5^{th}$ generation ($5^{th}$ Generation, 5G) system, or a new radio (New Radio, NR) system.

Although not shown, the terminal device 100 may further include a camera, a Bluetooth module, and the like. Details are not described herein again.

Various implementations of this application may be randomly combined to achieve different technical effects.

With descriptions of the foregoing implementations, a person skilled in the art may clearly understand that this application may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk (Disk) and disc (disc) used by this application includes a. compact disc CD, a laser disc, an optical disc, a digital versatile disc (DVD), a floppy disk and a Blu-ray disc, and the disk generally copies data magnetically, and the disc copies data optically by using a laser. The foregoing combination should also be included in the protection scope of the computer-readable medium.

In summary, what is described above is merely embodiments of the technical solutions of this application, but is not intended to limit the protection scope of this application. Any modification, equivalent replacement, improvement, or the like made according to the disclosure of this application shall fall within the protection scope of this application.

What is claimed is:
1. A method, implemented by a terminal device, for searching for a network, wherein the method comprises:
obtaining preset information that comprises public land mobile network (PLMN) information and that indicates networking modes associated with the PLMN information, wherein the networking modes comprise a standalone (SA) mode and a non-standalone (NSA) mode;
obtaining the PLMN information from the preset information; and
determining, based on the PLMN information and the preset information, a networking mode of the terminal device.

2. The method of claim 1, further comprising switching the networking mode from the NSA mode to the SA mode when a first parameter is greater than a first threshold.

3. The method of claim 2, wherein the first parameter is at least one parameter of a fifth generation (5G) access network and comprises:
a signal quality;
a signal strength;
a transmission rate;
a network registration success rate; or
a packet loss rate.

4. The method of claim 1, further comprising switching the networking mode from the SA mode to the NSA mode when a first parameter is greater than a first threshold.

5. The method of claim 4, wherein the first second parameter is at least one parameter of a fourth generation (4G) access network and comprises:
a signal quality;
a signal strength;
a transmission rate;
a network registration success rate; or
a packet loss rate.

6. The method of claim 1, further comprising:
obtaining a system message comprising a field information element (IE) upper layer indication-R15; and
switching the networking mode to the SA mode.

7. The method of claim 1, further comprising searching, based on a geographical location, to obtain the PLMN information from broadcast information.

8. The method of claim 1, further comprising further obtaining the preset information from a storage of the terminal device or from a server.

9. A terminal device, comprising:
a storage medium configured to store instructions; and
a processor coupled to the storage medium, wherein the instructions cause the processor to be configured to:
obtain preset information that comprises Public Land Mobile Network (PLMN) information and that indicates networking modes associated with the PLMN information, wherein the networking modes comprise a standalone (SA) mode and a non-standalone (NSA) mode;
obtain the PLMN information from the preset information; and
determine, based on the PLMN information and the preset information, a networking mode of the terminal device.

10. The terminal device of claim 9, wherein the instructions further cause the processor to be configured to switch the networking mode from the NSA mode to the SA mode when a first parameter is greater than a first threshold.

11. The terminal device of claim 10, wherein the first parameter is at least one parameter of a fifth generation (5G) access network and comprises:
a signal quality;
a signal strength;
a transmission rate;
a network registration success rate; or
a packet loss rate.

12. The terminal device of claim 9, wherein the instructions further cause the processor to be configured to switch the networking mode from the SA mode to the NSA mode when a first parameter is greater than a first threshold.

13. The terminal device of claim 12, wherein the first parameter is at least one parameter of a fourth generation (4G) access network and comprises:
   a signal quality;
   a signal strength;
   a transmission rate;
   a network registration success rate; or
   a packet loss rate.

14. The terminal device of claim 9, wherein the instructions further cause the processor to be configured to:
   obtain a system message comprising a field information element (IE) upper layer indication-R15; and
   switch the networking mode to the SA mode.

15. The terminal device of claim 9, wherein the instructions further cause the processor to be configured to search, based on a geographical location, to obtain the PLMN information from broadcast information.

16. The terminal device of claim 9, wherein the instructions further cause the processor to be configured to obtain the preset information from a storage of the terminal device or from a server.

17. A computer program product comprising instructions stored on a non-transitory computer-readable medium that, when executed by a processor, cause a terminal device to:
   obtain preset information that comprises Public Land Mobile Network (PLMN) information and that indicates networking modes associated with the PLMN information, wherein the networking modes comprise a standalone (SA) mode and a non-standalone (NSA) mode;
   obtain the PLMN information from the preset information; and
   determine, based on the PLMN information and the preset information, a networking mode of the terminal device.

18. The computer program product of claim 17, wherein the instructions further cause the terminal device to switch the networking mode from the NSA mode to the SA mode when a first parameter is greater than a first threshold.

19. The computer program product of claim 17, wherein the instructions further cause the terminal device to switch the networking mode from the SA mode to the NSA mode when a first parameter is greater than a first threshold.

20. The computer program product of claim 17, wherein the instructions further cause the terminal device to search, based on a geographical location, to obtain the PLMN information from broadcast information.

* * * * *